US011822903B2

(12) United States Patent
Gupta

(10) Patent No.: US 11,822,903 B2
(45) Date of Patent: Nov. 21, 2023

(54) INSTINCTIVE CIPHER COMPILATION AND IMPLEMENTATION

(71) Applicant: Bank of America Corporation, Charlotte, NC (US)

(72) Inventor: Saurabh Gupta, New Delhi (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/713,753

(22) Filed: Apr. 5, 2022

(65) Prior Publication Data
US 2023/0315399 A1  Oct. 5, 2023

(51) Int. Cl.
*G06F 8/30* (2018.01)
*G06F 8/10* (2018.01)

(52) U.S. Cl.
CPC . *G06F 8/31* (2013.01); *G06F 8/10* (2013.01)

(58) Field of Classification Search
CPC .................................................. G06F 8/10–30
USPC .................................................. 717/110–141
See application file for complete search history.

(56) References Cited

U.S. PATENT DOCUMENTS

| | | | | |
|---|---|---|---|---|
| 5,825,886 | A * | 10/1998 | Adams | H04L 9/002 380/37 |
| 6,490,354 | B2 * | 12/2002 | Venkatesan | H04L 9/0662 380/42 |
| 6,898,737 | B2 * | 5/2005 | Goeller | G06F 11/0793 714/39 |
| 10,491,610 | B2 * | 11/2019 | Jenkins | G06F 1/3206 |
| 10,771,489 | B1 * | 9/2020 | Bisht | G06N 20/00 |
| 10,803,197 | B1 * | 10/2020 | Liao | G06F 21/604 |
| 11,017,321 | B1 * | 5/2021 | Mishra | G05B 23/0283 |
| 11,321,374 | B2 * | 5/2022 | Steiert | G06F 16/972 |
| 11,347,579 | B1 * | 5/2022 | Curtokar | G06F 11/0751 |
| 11,550,903 | B1 * | 1/2023 | Epstein | G06F 21/57 |
| 11,605,021 | B1 * | 3/2023 | Khare | G06N 5/046 |

(Continued)

OTHER PUBLICATIONS

Patrignani et al., "Robustly Safe Compilation, an Efficient Form of Secure Compilation", ACM, pp. 1-41 (Year: 2021).*

(Continued)

*Primary Examiner* — Anil Khatri
(74) *Attorney, Agent, or Firm* — Banner & Witcoff, Ltd.

(57) ABSTRACT

Aspects of the disclosure relate to instinctive cipher compilation and implementation in a continuous integration and delivery environment. In some embodiments, a computing platform may receive, via the communication interface, a requirements document for an application. The computing platform may extract context data from the requirements document. The computing platform may scan a repository of code to identify code to be modified based on the context data. The computing platform may identify modifications to the code based on the context data and generate updated code based on the identified modifications. The computing platform may deploy and test the updated code in a test environment. The computing platform may determine a variance between the updated code and the requirements document and generate a variance report. In some embodiments, the computing platform may compare the variance to a predetermined threshold, and accept or redeploy the updated code based on the comparison.

18 Claims, 9 Drawing Sheets

(56) References Cited

U.S. PATENT DOCUMENTS

| | | | |
|---|---|---|---|
| 11,698,947 B2* | 7/2023 | Cowen | G06F 18/2148 382/155 |
| 2006/0248504 A1 | 11/2006 | Hughes | |
| 2013/0086556 A1 | 4/2013 | Grechanik | |
| 2013/0219361 A1 | 8/2013 | Fiebig et al. | |
| 2015/0220426 A1 | 8/2015 | Spektor et al. | |
| 2016/0170741 A9 | 6/2016 | Fiebig et al. | |
| 2018/0088929 A1 | 3/2018 | Eberlein et al. | |
| 2018/0275970 A1 | 9/2018 | Woulfe et al. | |
| 2019/0138288 A1 | 5/2019 | Brealey et al. | |
| 2019/0171550 A1 | 6/2019 | Eizenman et al. | |
| 2019/0220390 A1 | 7/2019 | Bender et al. | |
| 2019/0317754 A1* | 10/2019 | Mosquera | H04L 51/02 |
| 2020/0110693 A1 | 4/2020 | Herrin et al. | |
| 2020/0364133 A1* | 11/2020 | Vidal | G06F 9/45558 |
| 2021/0049127 A1 | 2/2021 | Kunchakarra et al. | |
| 2021/0081194 A1 | 3/2021 | Negoshian et al. | |
| 2021/0117827 A1 | 4/2021 | Wu | |
| 2021/0124576 A1 | 4/2021 | Gungabeesoon et al. | |
| 2021/0133091 A1 | 5/2021 | Pillai et al. | |
| 2021/0182035 A1 | 6/2021 | Peng | |
| 2021/0182174 A1 | 6/2021 | Velammal et al. | |
| 2021/0216406 A1 | 7/2021 | Silverstein et al. | |
| 2021/0279050 A1 | 9/2021 | Chen | |
| 2021/0294716 A1 | 9/2021 | Mosquera et al. | |
| 2022/0100641 A1 | 3/2022 | Eizenman et al. | |

OTHER PUBLICATIONS

Leather et al, "Automatic Feature Generation for Machine Learning-Based Optimising Compilation", ACM, pp. 1-32 (Year: 2014).*

Bethencourt et al, "Ciphertext-Policy Attribute-Based Encryption", IEEE, pp. 1-14 (Year: 2007).*

Lops e al, "Leveraging the LinkedIn Social Network Data for Extracting Content-based User Profiles", ACM, pp. 293-296 (Year: 2011).*

Song et al, "Automatic Extraction of Web Data Records Containing User-Generated Content", ACM, pp. 39-48 (Year: 2010).*

Gupta et al, "DOM-based Content Extraction of HTML Documents", ACM, pp. 207-214 (Year: 2003).*

* cited by examiner

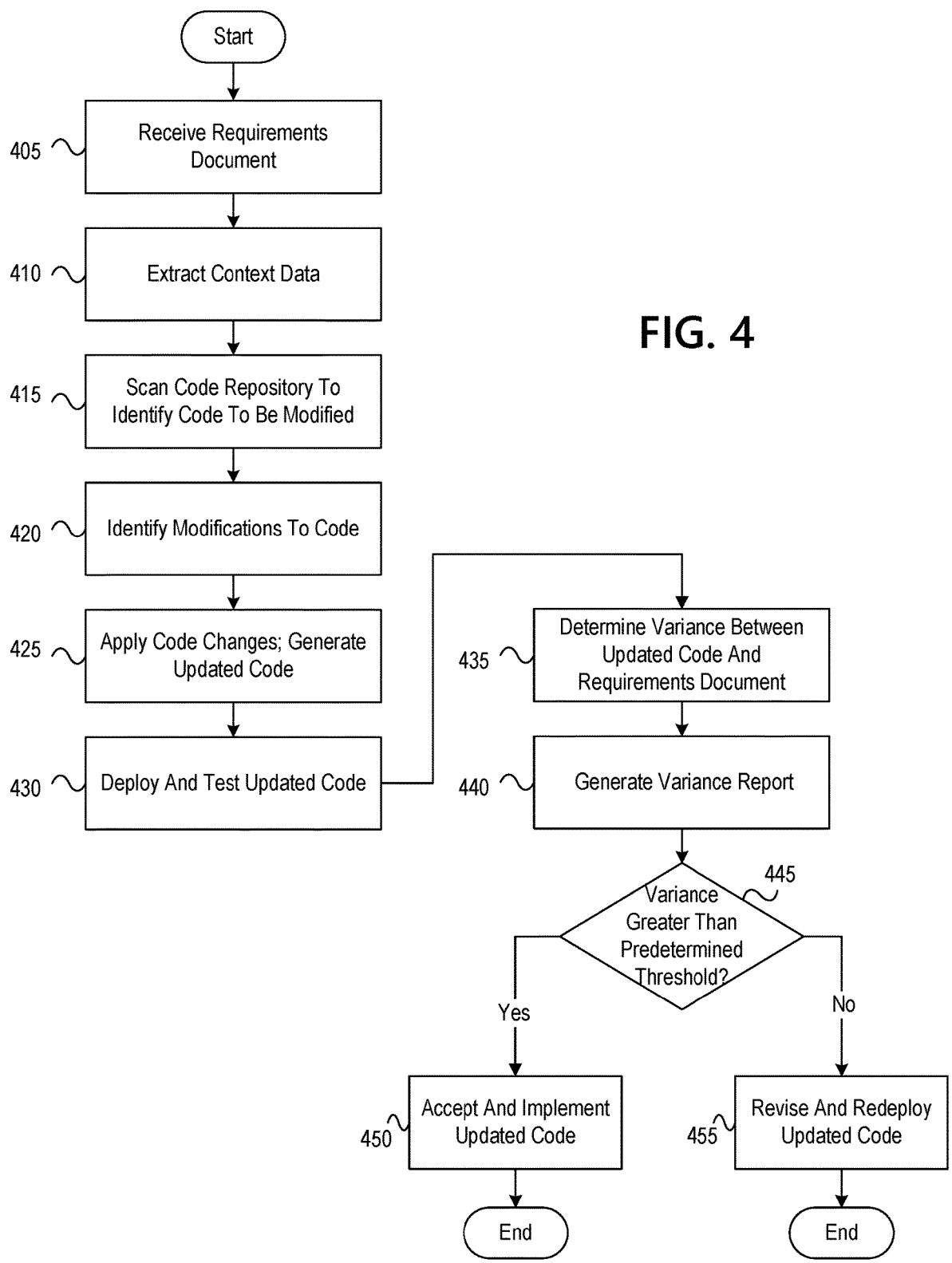

INSTINCTIVE CIPHER COMPILATION AND IMPLEMENTATION

BACKGROUND

Aspects of the disclosure relate to electrical computers, digital processing systems, and code modification. In particular, one or more aspects of the disclosure relate to instinctive cipher compilation and implementation in a continuous integration and delivery environment.

Techniques aiming to support software developers in writing application code often rely heavily on manual intervention and lack automation. The process of writing application code is often time intensive, inefficient, and prone to errors. In many instances, it may be difficult to utilize current software development and implementation techniques to efficiently and accurately understand software requirements, interpret areas for change, and make corresponding code changes.

SUMMARY

Aspects of the disclosure provide effective, efficient, scalable, and convenient technical solutions that address and overcome the technical problems associated with software development and implementation by providing an instinctive and intelligent cipher compilation and implementation mechanism in a continuous integration and delivery environment. In accordance with one or more embodiments, a computing platform having at least one processor, a communication interface, and memory may receive, via the communication interface, a requirements document for an application. The computing platform may extract context data from the requirements document. The computing platform may scan a repository of code to identify code to be modified based on the context data. The computing platform may identify modifications to the code based on the context data. The computing platform may generate updated code based on the identified modifications. The computing platform may deploy and test the updated code in a test environment. The computing platform may determine a variance between the updated code and the requirements document. The computing platform may generate a report to identify the variance.

In some embodiments, the computing platform may compare the variance to a predetermined threshold, and accept or redeploy the updated code based on the comparison.

In some arrangements, the computing platform may identify the variance being greater than a predetermined threshold, and responsive to identifying the variance being greater than the predetermined threshold, regenerate one or more portions of the updated code.

In some examples, the predetermined threshold may be set by a user of a computing device. In some examples, the predetermined threshold may be set using a machine learning model.

In some embodiments, receiving the requirements document may include reading requirements from language independent documents.

In some example arrangements, extracting the context data from the requirements document may include identifying inferences from text using natural language processing.

In some examples, identifying modifications to code may include detecting a type of programming language and syntax being used.

In some embodiments, generating the updated code based on the identified modifications may include generating the updated code using a machine learning model.

In some arrangements, the computing platform may send, via the communication interface, the identified modifications to a user computing device, and receive, via the communication interface, user feedback.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 4 depicts an illustrative method for instinctive cipher compilation and implementation in accordance with one or more example embodiments.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure relate to instinctive and intelligent cipher compilation and implementation in a continuous integration and delivery (CI/CD) environment. In particular, one or more aspects of the disclosure may integrate with any DevOps CI/CD platform for end-to-end automated development, testing, and reporting. Additional aspects of the disclosure may automatically interpret requirements from a requirements document irrespective of the language used, infer underlying expectations, identify a programming language and syntax used, identify pieces of code where a change is to be made, and write code to address the change. Additional aspects of the disclosure may automatically deploy the updated code to a lower level environment via a DevOps CI/CD pipeline, and verification of the changes may be deployed on the lower level environment. Further aspects of the disclosure may facilitate remaking of changes, redeployment, and retesting based on test results or a degree of compliance based on original requirements. Implementation time may be greatly reduced.

Figure 1A:
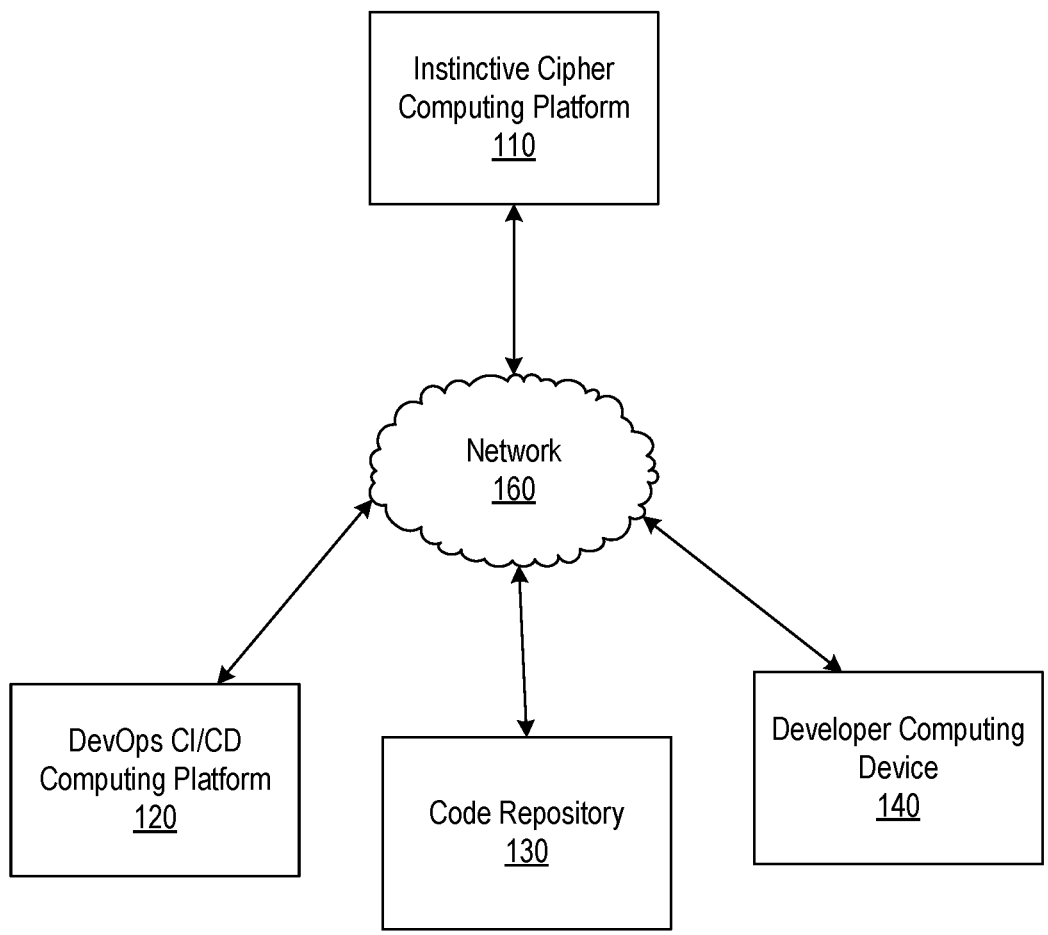
FIGS. 1A and 1B depict an illustrative computing environment for instinctive cipher compilation and implementation in accordance with one or more example embodiments.
Figure 1B:
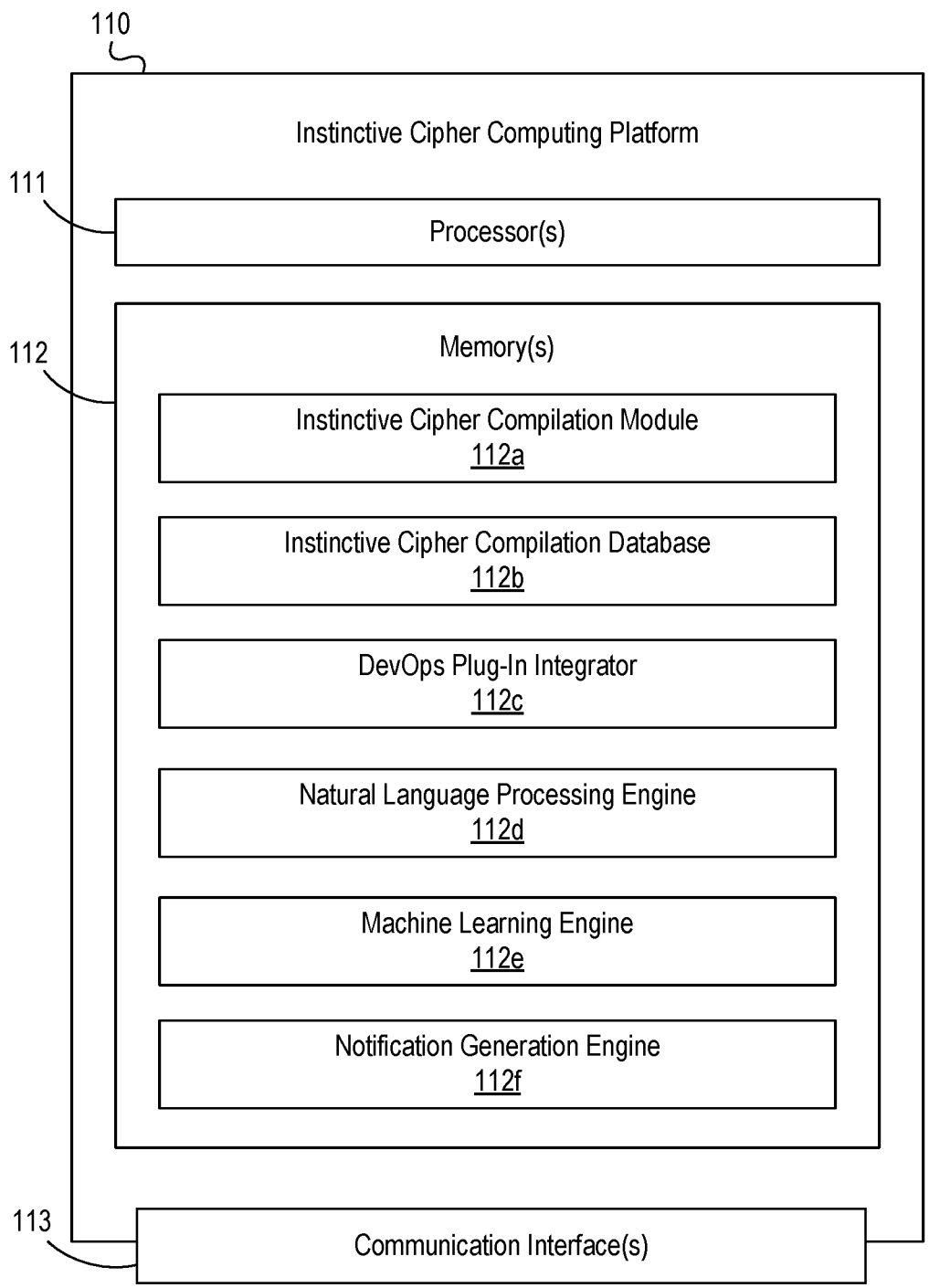

FIGS. 1A and 1B depict an illustrative computing environment for instinctive cipher compilation and implementation in accordance with one or more example arrangements. Referring to FIG. 1A, computing environment 100 may include one or more devices (e.g., computer systems, communication devices, servers). For example, computing environment 100 may include an instinctive cipher computing platform 110, a DevOps continuous integration and continuous delivery (CI/CD) testing computing platform 120, a code repository 130, and a developer computing device 140. Although one developer computing device 140 is shown for illustrative purposes, any number of developer computing devices may be used without departing from the disclosure.

As illustrated in greater detail below, instinctive cipher computing platform 110 may include one or more computing devices configured to perform one or more of the functions described herein. For example, instinctive cipher computing platform 110 may include one or more computers (e.g., laptop computers, desktop computers, servers, server blades, or the like) configured to read and perceive requirements documents, identify pieces of code to be changed, write code to address the changes, deploy and test the updated code, identify one or more variances, and/or one or more other functions described herein.

DevOps CI/CD computing platform 120 may include distinct and physically separate data centers or other groupings of server computers that are operated by and/or otherwise associated with an organization, such as a financial institution. In addition, DevOps CI/CD computing platform 120 may house a plurality of server computers and various other computers, network components, and devices. The DevOps CI/CD computing platform 120 may execute test software codes based on information and/or code parameters received from instinctive cipher computing platform 110.

Code repository 130 may store source code. Code repository 130 may include one or more computing devices and/or other computer components (e.g., processors, memories, communication interfaces). In some examples, code repository 130 may include all code to execute one or more applications associated with an enterprise organization. In some examples, code repository 130 may be a code hosting platform for version control and collaboration. For instance, code repository 130 may allow developers to continuously make code changes, and the modified code may be integrated into the repository. In addition, and as illustrated in greater detail below, code repository 130 may be configured to receive information from, send information to, and/or otherwise exchange information with one or more devices as described herein.

Developer computing device 140 may include one or more computing devices and/or other computer components (e.g., processors, memories, communication interfaces). For example, developer computing device 140 may be a desktop computing device (e.g., desktop computer, terminal), or the like or a mobile computing device (e.g., smartphone, tablet, smart watch, laptop computer, or the like) used by developers interacting with instinctive cipher computing platform 110, DevOps CI/CD computing platform 120, and/or code repository 130. In addition, developer computing device 140 may be linked to and/or used by one or more enterprise users (who may, e.g., be employees of an enterprise organization operating the enterprise center where developer computing device 140 is deployed and/or used). For instance, developer computing device 140 may be deployed at an enterprise center, such as the enterprise center where instinctive cipher computing platform 110 is deployed, so that developer computing device 140 may be used by one or more employees of an enterprise organization operating the enterprise center when such employees are facilitating enterprise software development efforts.

Computing environment 100 also may include one or more networks, which may interconnect one or more of instinctive cipher computing platform 110, DevOps CI/CD computing platform 120, code repository 130, and developer computing device 140. For example, computing environment 100 may include a network 160 (which may, e.g., interconnect instinctive cipher computing platform 110, DevOps CI/CD computing platform 120, code repository 130, developer computing device 140, and/or one or more other systems which may be associated with an enterprise organization, such as a financial institution, with one or more other systems, public networks, sub-networks, and/or the like).

In one or more arrangements, instinctive cipher computing platform 110, DevOps CI/CD computing platform 120, code repository 130, and developer computing device 140 may be any type of computing device capable of analyzing documents using natural language processing, identifying code to be changed, and/or writing modified code. In one or more arrangements, instinctive cipher computing platform 110, DevOps CI/CD computing platform 120, code repository 130, and developer computing device 140 may be any type of computing device capable of receiving a user interface, receiving input via the user interface, and communicating the received input to one or more other computing devices. For example, instinctive cipher computing platform 110, DevOps CI/CD computing platform 120, code repository 130, developer computing device 140, and/or the other systems included in computing environment 100 may, in some instances, include one or more processors, memories, communication interfaces, storage devices, and/or other components. As noted above, and as illustrated in greater detail below, any and/or all of the computing devices included in computing environment 100 may, in some instances, be special-purpose computing devices configured to perform specific functions as described herein.

Referring to FIG. 1B, instinctive cipher computing platform 110 may include one or more processor(s) 111, memory(s) 112, and communication interface(s) 113. A data bus may interconnect processor 111, memory 112, and communication interface 113. Communication interface 113 may be a network interface configured to support communication between instinctive cipher computing platform 110 and one or more networks (e.g., network 160 or the like). Memory 112 may include one or more program modules having instructions that when executed by processor 111 cause instinctive cipher computing platform 110 to perform one or more functions described herein and/or one or more databases and/or other libraries that may store and/or otherwise maintain information which may be used by such program modules and/or processor 111. In some instances, the one or more program modules and/or databases may be stored by and/or maintained in different memory units of instinctive cipher computing platform 110 and/or by different computing devices that may form and/or otherwise make up instinctive cipher computing platform 110. For example, memory 112 may have, store, and/or include an instinctive cipher compilation module 112a, an instinctive cipher compilation database 112b, a DevOps plug-in integrator 112c, a natural language processing (NLP) engine 112d, a machine learning (ML) engine 122e, and a notification generation engine 112f.

Instinctive cipher compilation module 112a, may have instructions that direct and/or cause instinctive cipher computing platform 110 to, for instance, read and perceive requirements documents, identify pieces of code to be changed, write code to address the changes, deploy and test the updated code, and/or instructions that direct instinctive cipher computing platform 110 to perform other functions, as discussed in greater detail below. Instinctive cipher compilation database 112b may store information used by instinctive cipher compilation module 112a and/or instinctive cipher computing platform 110 in performing intelligent cipher/code compilation and/or in performing other functions, as discussed in greater detail below. DevOps plug-in integrator 112c may facilitate increased efficiency, speed, and security of software development and delivery by integrating with a DevOps CI/CD platform for building and deploying code post automatic code changes. Natural language processing (NLP) engine 112d may use one or more context processing algorithms to identify different requirements, and/or perform other functions, as discussed in greater detail below.

Machine learning engine 112e may have instructions that direct and/or cause instinctive cipher computing platform 110 to set, define, and/or iteratively redefine rules, techniques and/or other parameters used by intelligent instinctive cipher computing platform 110 and/or other systems in computing environment 100 in automatically generating application code based on requirements documents (e.g., software requirements documents). In some examples, instinctive cipher computing platform 110 may build and/or train one or more machine learning models. For example, memory 112 may have, store, and/or include historical/training data. In some examples, instinctive cipher computing platform 110 may receive historical and/or training data and use that data to train one or more machine learning models stored in machine learning engine 112e. The historical and/or training data may include, for instance, code change data based on code changes, code dependency data, and/or the like. The data may be gathered and used to build and train one or more machine learning models executed by machine learning engine 112e to identify modifications to one or more portions of code, intelligently generate code in accordance with the identified modifications, and/or perform other functions, as discussed in greater detail below. Various machine learning algorithms may be used without departing from the disclosure, such as supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms, artificial neural network algorithms, and the like. Additional or alternative machine learning algorithms may be used without departing from the disclosure.

Notification generation engine 112f may have instructions that direct and/or cause instinctive cipher computing platform 110 to send, to another computing device, results related to execution of a test software code. Notification generation engine 112f may store instructions and/or data that may cause or enable the instinctive cipher computing platform 110 to dynamically generate and/or execute notifications. For instance, in some examples, variance information may be compiled following the execution of a test software code on the instinctive cipher computing platform 110. Accordingly, as test code result and variance information are compiled, one or more notifications may be dynamically generated and transmitted to provide relevant information to a developer computing device associated with the test code (e.g., developer computing device 140).

Figure 2A:
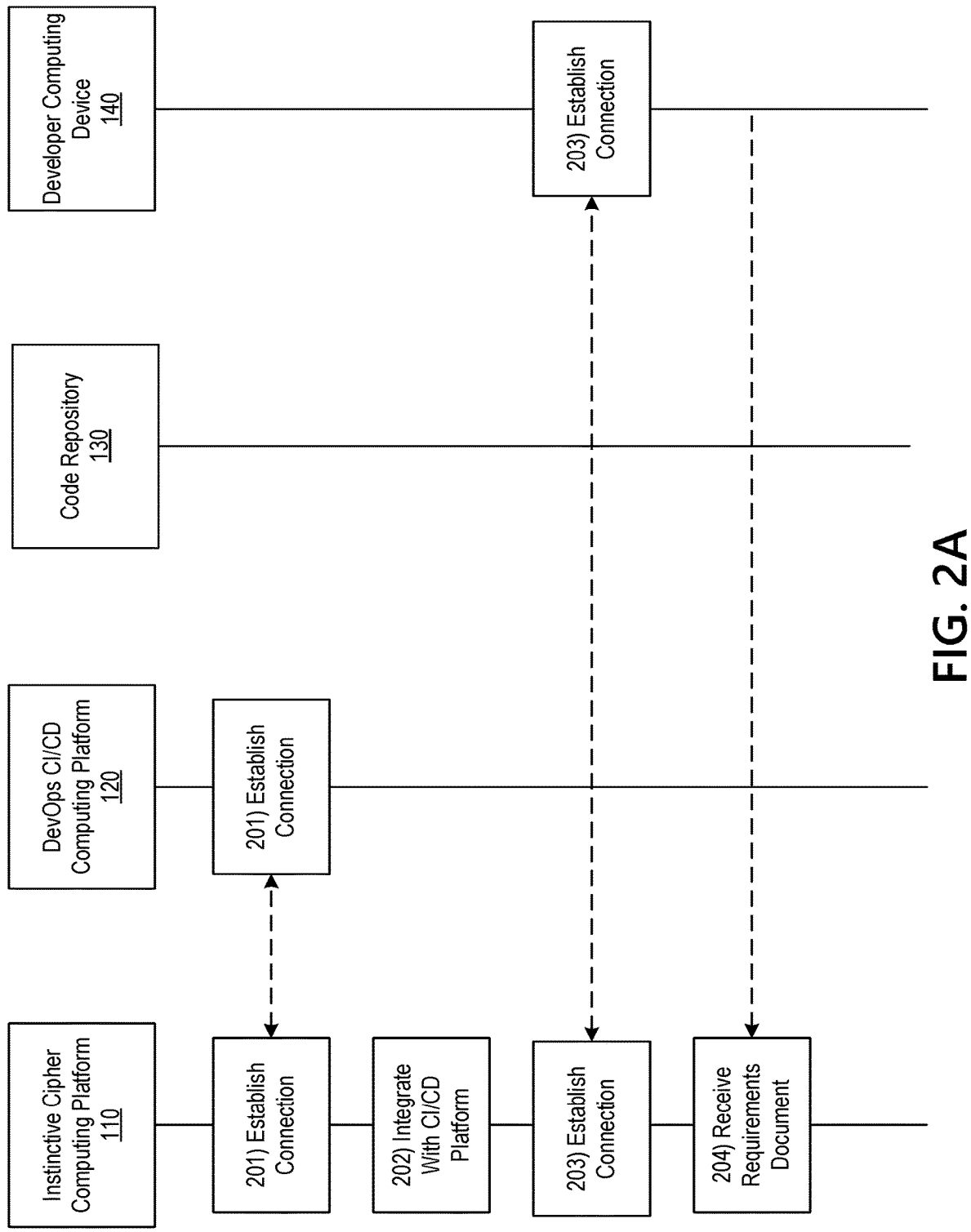
FIGS. 2A-2E depict an illustrative event sequence for instinctive cipher compilation and implementation in accordance with one or more example embodiments.

FIGS. 2A-2E depict an illustrative event sequence for instinctive cipher compilation and implementation in accordance with one or more example embodiments. Referring to FIG. 2A, at step 201, instinctive cipher computing platform 110 may establish a connection with a continuous integration and continuous delivery (CI/CD) testing computing platform 120. For example, instinctive cipher computing platform 110 may establish a first wireless data connection with DevOps CI/CD computing platform 120 to link instinctive cipher computing platform 110 with DevOps CI/CD computing platform 120. In some instances, instinctive cipher computing platform 110 may identify whether or not a connection is already established with DevOps CI/CD computing platform 120. If a connection is already established with DevOps CI/CD computing platform 120, instinctive cipher computing platform 110 might not re-establish the connection. If a connection is not yet established with the DevOps CI/CD computing platform 120, instinctive cipher computing platform 110 may establish the first wireless data connection as described above.

At step 202, instinctive cipher computing platform 110 may integrate with the DevOps CI/CD platform 120 (e.g., via DevOps plug-in integrator 112c). For example, DevOps CI/CD platform 120 may be used to automate tasks associated with software delivery from development to testing through production deployment.

At step 203, instinctive cipher computing platform 110 may establish a connection with developer computing device 140. For example, instinctive cipher computing platform 110 may establish a second wireless data connection with developer computing device 140 to link instinctive cipher computing platform 110 with developer computing device 140. In some instances, instinctive cipher computing platform 110 may identify whether or not a connection is already established with developer computing device 140. If a connection is already established with developer computing device 140, instinctive cipher computing platform 110 might not re-establish the connection. If a connection is not yet established with the developer computing device 140, instinctive cipher computing platform 110 may establish the second wireless data connection as described above.

At step 204, instinctive cipher computing platform 110 may receive, via the communication interface (e.g., communication interface 113) and while the second wireless data connection is established, a requirements document for an application. The requirements document may specify high-level requirements for an application. For example, the requirements may be specified in plain English sentences so that a non-technical person may understand the requirements. The requirements may be specified in other formats and in other languages. Instinctive cipher computing platform 110 may read/receive requirements from language independent documents. For instance, instinctive cipher computing platform 110 may perceive and understand the requirements (e.g., its contents and other details) irrespective of the language or format in which the requirements document is written.

Figure 2B:
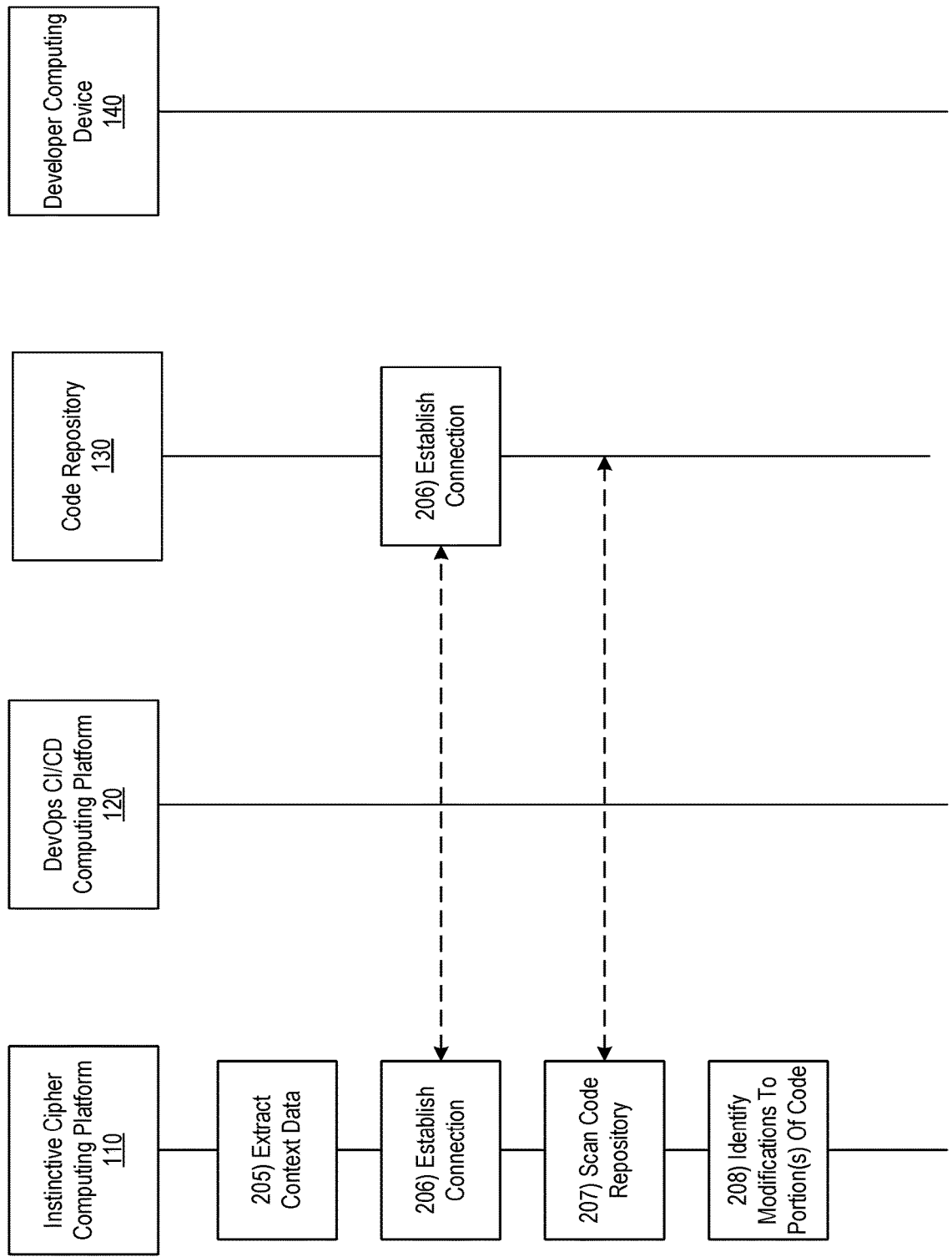

Referring to FIG. 2B, at step 205, instinctive cipher computing platform 110 may analyze the requirements document and extract context data from the requirements document. In extracting the context data from the requirements document, instinctive cipher computing platform 110 may identify (e.g., via natural language processing engine 112d) inferences from text using natural language processing techniques. In some examples, instinctive cipher computing platform 110 may decompose and parse the requirements document into a set of linguistic distinctions (e.g., parts of speech, phrases, named entities, document categories, grammatical relationships of words, punctuation, sentence structures, etc.). For instance, instinctive cipher computing platform 110 may employ parts of speech tagging and relationship searching to identify sentence components (e.g., as nouns, verbs, adjectives, pronouns, etc.), and to recognize and disambiguate entities in text. The data may then be further processed using machine learning models to interpret the document.

At step 206, instinctive cipher computing platform 110 may establish a connection with code repository 130. For example, instinctive cipher computing platform 110 may establish a third wireless data connection with code repository 130 to link instinctive cipher computing platform 110 with code repository 130. In some instances, instinctive cipher computing platform 110 may identify whether or not a connection is already established with code repository 130. If a connection is already established with code repository 130, instinctive cipher computing platform 110 might not re-establish the connection. If a connection is not yet established with the code repository 130, instinctive cipher computing platform 110 may establish the third wireless data connection as described above.

At step 207, instinctive cipher computing platform 110 may scan a repository of code (e.g., application source code from code repository 130) to identify code to be modified based on the context data. In some examples, instinctive cipher computing platform 110 may automatically integrate with the code repository (e.g., code repository 130). For instance, instinctive cipher computing platform 110 may fetch code from the repository, push code into the repository, merge code in the repository, perform code conflict resolution, and/or the like, without manual intervention.

At step 208, instinctive cipher computing platform 110 may identify modifications to the code based on the context data. In some examples, instinctive cipher computing platform 110 may identify portions of code needing change based on keywords. For instance, instinctive cipher computing platform 110 may use programming language naming conventions, file names, method names, and/or the like, to identify and locate relevant portions of the code needing change (e.g., based on the context data). In one non-limiting example, in developing an employee database, if there is a change required in an employee class, instinctive cipher computing platform 110 may identify code files with the name "employee.java" and/or the like. In some examples, instinctive cipher computing platform 110 may identify a type of change to be made (e.g., changes to be written from scratch, or an enhancement to existing code). In identifying modifications to code, instinctive cipher computing platform 110 may detect a type of programming language and syntax being used.

Figure 2C:
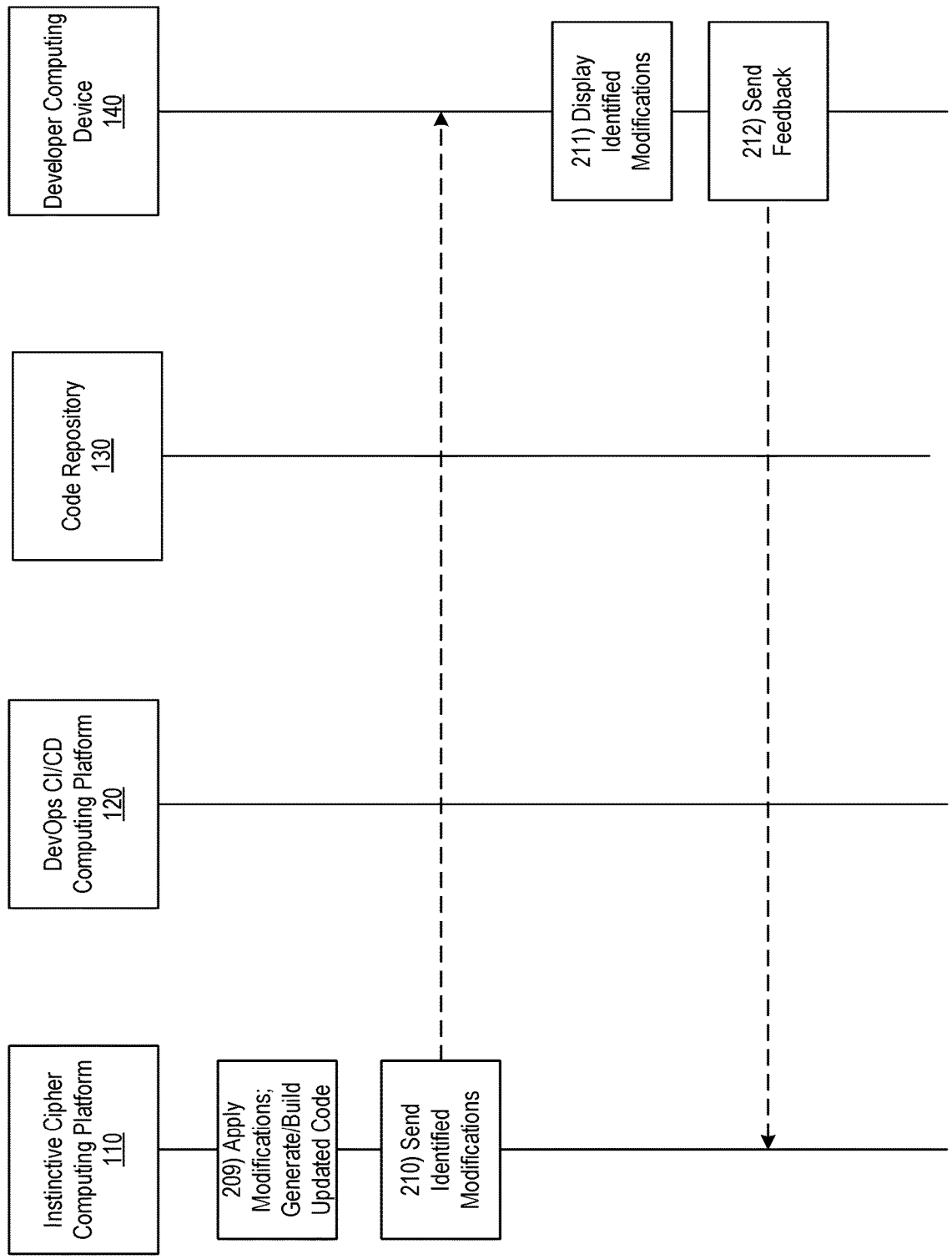

Referring to FIG. 2C, at step 209, instinctive cipher computing platform 110 may generate (e.g., write) updated code based on the identified modifications. For example, instinctive cipher computing platform 110 may apply the identified modifications to align the code with the requirements document. In some examples, instinctive cipher computing platform 110 may be intelligent enough to understand which part of the code needs a change, and begin implementing those changes in the language in which the code is written. In some examples, instinctive cipher computing platform 110 may generate the updated code using artificial intelligence and machine learning models (e.g., via machine learning engine 112e).

In some embodiments, at step 210, instinctive cipher computing platform 110 may send, via the communication interface (e.g., communication interface 113) and while the second wireless data connection is established, the identified modifications to a user computing device (e.g., developer computing device 140). In some examples, instinctive cipher computing platform 110 may cause the identified modifications to be displayed on one or more user interfaces (e.g., on a display device of developer computing device 140 or other user computing device). For instance, instinctive cipher computing platform 110 may automatically modify the code to include the identified modifications. In some examples, instinctive cipher computing platform 110 may highlight, annotate, or otherwise visually distinguish the applied modifications to the code.

At step 211, user computing device (e.g., developer computing device 140) may display the identified modifications (e.g., on a display device of developer computing device 140). At step 212, the user device (e.g., developer computing device 140) may send, via the communication interface (e.g., communication interface 113) and while the second wireless data connection is established, feedback (e.g., user feedback) to instinctive cipher computing platform 110.

Figure 2D:
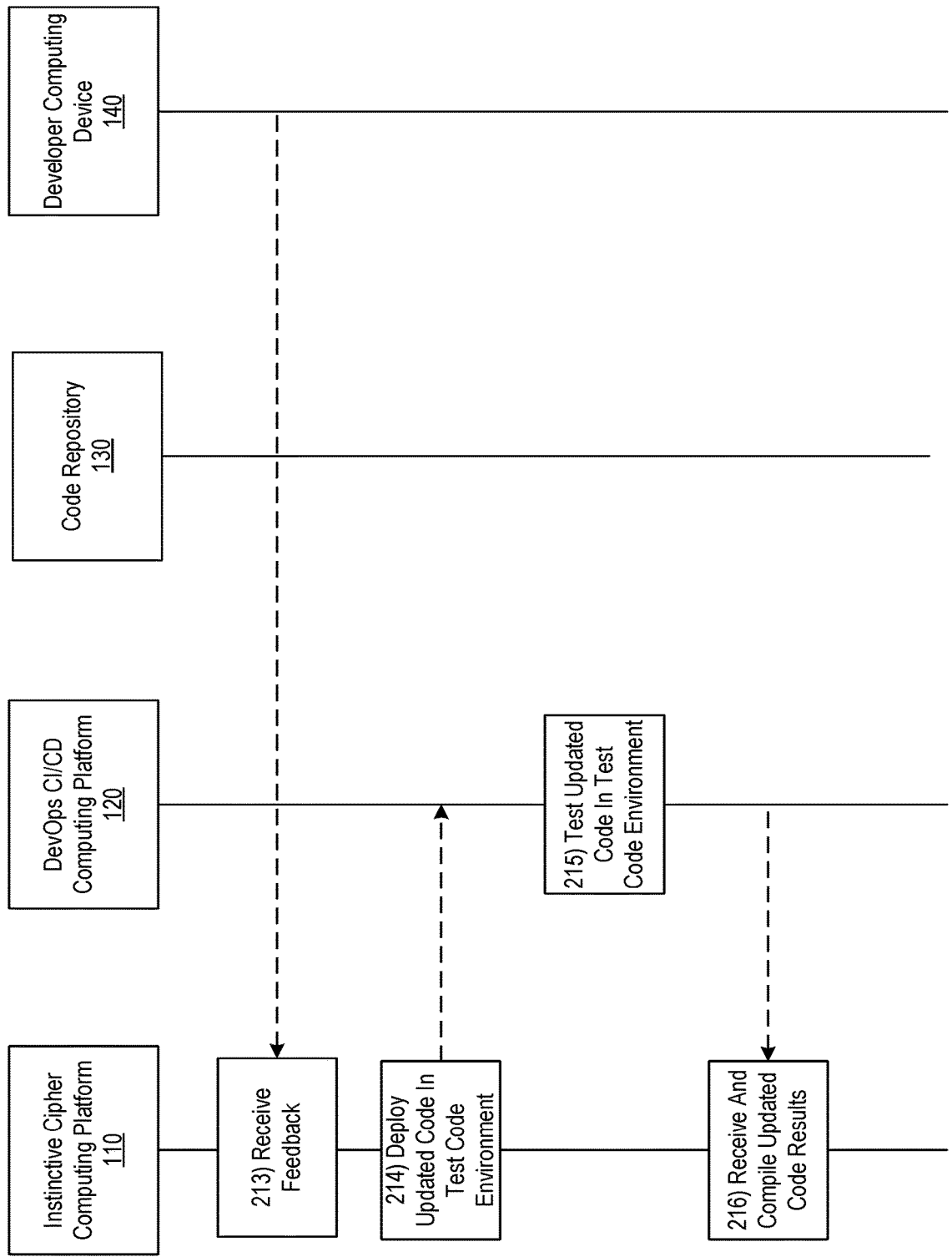

Referring to FIG. 2D, at step 213, instinctive cipher computing platform 110 may receive, via the communication interface (e.g., communication interface 113) and while the second wireless data connection is established, the feedback (e.g., from developer computing device 140). For instance, instinctive cipher computing platform 110 may receive user input and/or approval to integrate the code changes to the code repository (e.g., code repository 130). One or more of steps 210-213 may be optional in accordance with aspects of the disclosure, and code may be deployed for testing without user input.

At step 214, instinctive cipher computing platform 110 may deploy the updated code in a test code environment (e.g., via DevOps CI/CD computing platform 120). For instance, instinctive cipher computing platform 110 may directly build (e.g., create the deployable build package) and deploy the updated code to a desired environment post automatic code changes. At step 215, instinctive cipher computing platform 110 may test the updated code in the test code environment (e.g., via DevOps CI/CD computing platform 120). For instance, instinctive cipher computing platform may perform direct deployment to a lower level environment without manual intervention and automatically test the code changes on the lower level environment post deployment. In some examples, instinctive cipher computing platform 110 may automatically integrate with downstream systems (e.g., third-party web services) to test the code changes.

At step 216, upon completion of the test code execution, instinctive cipher computing platform 110 may receive and compile test code results that result from running the test code. Such results may include a simple pass or fail indicator, and/or error information relating to any errors encountered. In addition, instinctive cipher computing platform 110 may write results data to a results database. In some examples, based on the results, instinctive cipher computing platform 110 may automatically redo the changes, redeploy, and retest, if needed. In some examples, instinctive cipher computing platform 110 may automatically fix issues or make other appropriate changes in the code repository (e.g., software issues, such as bugs or other errors reported at step 216).

Figure 2E:
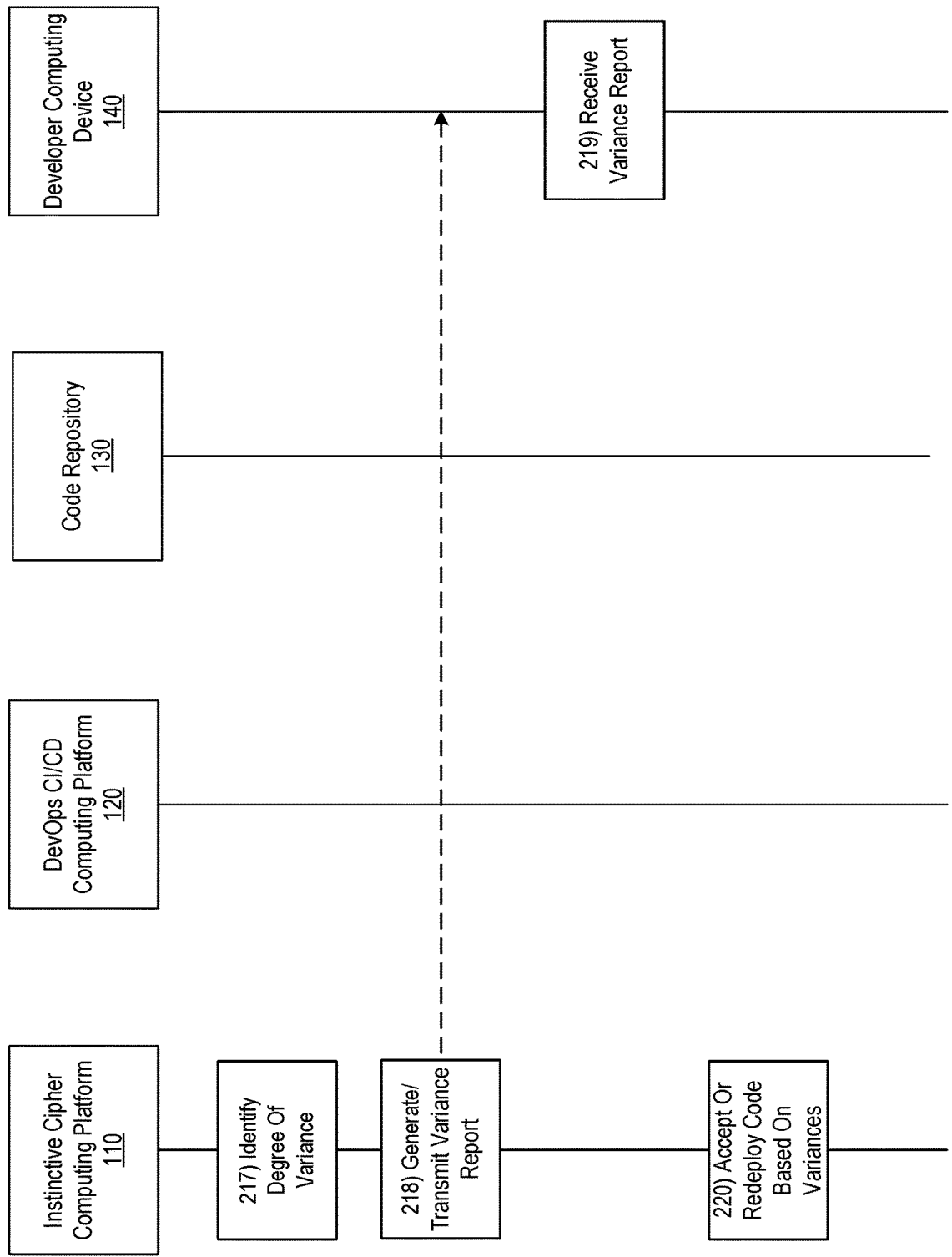

Referring to FIG. 2E, at step 217, instinctive cipher computing platform 110 may determine (e.g., measure) a degree of variance (e.g., a degree of compliance based on the original requirements documents) between the updated code and requirements of the requirements document. For instance, if ten requirements were supposed to be developed and after testing, instinctive cipher computing platform 110 identifies that only seven of those requirements have been implemented, then a variance percentage of seventy percent may be identified. In some embodiments, at step 218, instinctive cipher computing platform 110 may generate a variance report (e.g., an indication of the variance) and transmit, via the communication interface (e.g., communication interface 113) and while the second wireless data connection is established, the variance report to the developer computing device 140 (e.g., via notification generation engine 112*f*).

Figure 3:
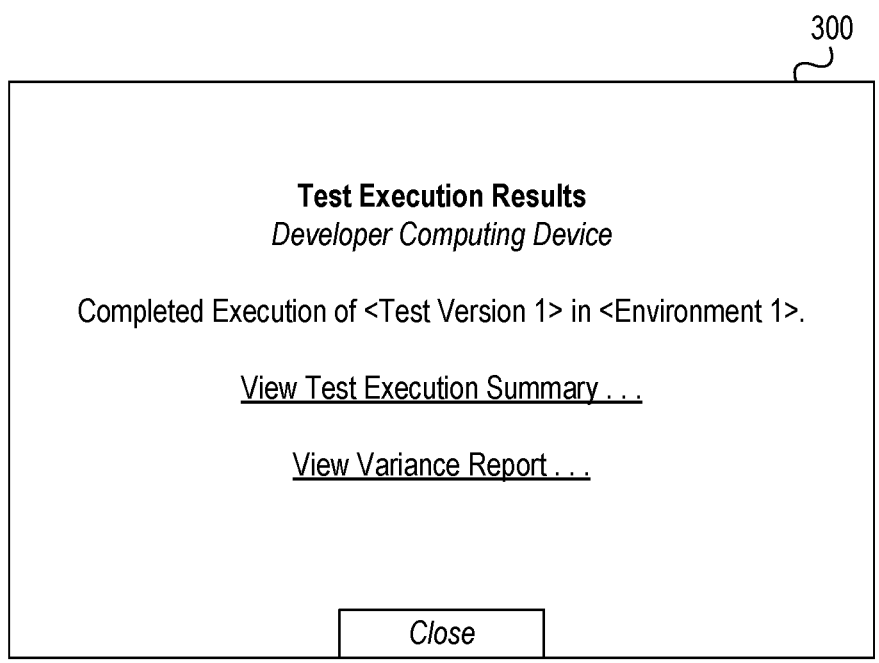
FIG. 3 depicts an example graphical user interface for instinctive cipher compilation and implementation in accordance with one or more example embodiments.

At step 219, the developer computing device 140 may receive and display the variance report, e.g., on a user interface display on the developer computing device 140. For example, instinctive cipher computing platform 110 may cause developer computing device 140 to display and/or otherwise present one or more graphical user interfaces similar to graphical user interface 300, which is illustrated in FIG. 3. As seen in FIG. 3, graphical user interface 300 may include text and/or other information associated with the test execution results, which may include a variance report (e.g., "Completed Execution of <Test Version 1> in <Environment 1>. [View Test Execution Summary . . . ] [View Variance Report . . . ]"). It will be appreciated that other and/or different notifications may also be provided.

At step 220, instinctive cipher computing platform 110 may compare the variance to a predetermined threshold (e.g., a variance cutoff), and accept or redeploy the updated code based on the comparison. In some examples, instinctive cipher computing platform 110 may identify the variance as being greater than (e.g., above) a predetermined threshold and in response, regenerate (e.g., make further modifications, remove modifications made previously, or the like) and redeploy one or more portions of the updated code. If the variance is less than (e.g., below) the predetermined threshold, the variance may be low enough that the code may be implemented or used in production. In some examples, the one or more errors leading to a variance may be identified and, based on a type of error, the code may be regenerated and/or redeployed or implemented. In some instances, instinctive cipher computing platform 110 might just identify the variance portions (e.g., particular parts of the code that have failed) and recheck/rewrite only those portions of code. In some instances, where the degree of variance is very high (e.g., if after testing, instinctive cipher computing platform 110 finds that out of ten, only one requirement is being met and nine test cases are failing), then the requirements documents may be evaluated anew and the process may start again beginning from step 205. For instance, the variance may be compared to a second threshold (e.g., a minimum threshold for revising the modified code) to determine whether the variance is great enough that the process should begin again (e.g., by analyzing the requirements document and identifying/generating code modifications) or the modified portions should be edited to correct identified errors. By way of machine learning, the degree of variance (e.g., degree of compliance) may improve with each iteration of code generation.

Additionally, the predetermined thresholds may be configurable. In some instances, the predetermined thresholds may be set (e.g., defined) by a user of a computing device (e.g., developer computing device 140). In some instances, the predetermined thresholds may be set using a machine learning model. In some examples, the thresholds may be a percentage, an integer, or a range depending upon the particular implementation.

FIG. 4 depicts an illustrative method for instinctive cipher compilation and implementation in accordance with one or more example embodiments. Referring to FIG. 4, at step 405, a computing platform having at least one processor, a communication interface, and memory may receive, via the communication interface, a requirements document for an application. At step 410, the computing platform may extract context data from the requirements document. At step 415, the computing platform may scan a repository of code to identify code to be modified based on the context data. At step 420, the computing platform may identify modifications to the code based on the context data. At step 425, the computing platform may generate updated code based on the identified modifications. At step 430, the computing platform may deploy and test the updated code in a test environment. At step 435, the computing platform may determine a variance between the updated code and the requirements document. At step 440, the computing platform may generate a report to identify the variance. At step 445, the computing platform may determine whether the variance is greater than (e.g., above) a predetermined threshold. If the variance is greater than the predetermined threshold, the computing platform may proceed to step 450. At step 450, the computing platform may accept and/or implement the updated code. If the variance is less than (e.g., not greater than) the predetermined threshold, the computing platform may proceed to step 455. At step 455, the computing platform may revise and/or redeploy one or more portions of the updated code.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
    at least one processor;
    a communication interface communicatively coupled to the at least one processor; and
    memory storing computer-readable instructions that, when executed by the at least one processor, cause the computing platform to:
        receive, via the communication interface, a requirements document specifying high-level requirements for an application, wherein the requirements are provided in plain language sentences;
        extract context data from the requirements document, wherein extracting context data from the requirements document includes:
            identifying inferences from text of the requirements document, wherein identifying inferences from the text of the requirements document is performed using natural language processing;
            decomposing and parsing the requirements document into a set of linguistic distinctions; and
            employing part of speech tagging and relationship searching to identify sentence components and recognize and disambiguate entities in the text;
        scan a repository of code to identify code to be modified based on the context data;
        identify modifications to the code based on the context data;
        generate updated code based on the identified modifications;
        deploy and test the updated code in a test environment;
        determine a variance between the updated code and the requirements document; and
        generate a report to identify the variance.

2. The computing platform of claim 1, wherein the memory stores additional computer-readable instructions that, when executed by the at least one processor, cause the computing platform to:
    compare the variance to a predetermined threshold; and
    accept or redeploy the updated code based on the comparison.

3. The computing platform of claim 2, wherein the memory stores additional computer-readable instructions that, when executed by the at least one processor, cause the computing platform to:
    identify the variance being greater than a predetermined threshold; and
    responsive to identifying the variance being greater than the predetermined threshold, regenerate one or more portions of the updated code.

4. The computing platform of claim 2, wherein the predetermined threshold is set by a user of a computing device.

5. The computing platform of claim 2, wherein the predetermined threshold is set using a machine learning model.

6. The computing platform of claim 1, wherein receiving the requirements document comprises reading requirements from language independent documents.

7. The computing platform of claim 1, wherein identifying modifications to code comprises detecting a type of programming language and syntax being used.

8. The computing platform of claim 1, wherein generating the updated code based on the identified modifications comprises generating the updated code using a machine learning model.

9. The computing platform of claim 1, wherein the memory stores additional computer-readable instructions that, when executed by the at least one processor, cause the computing platform to:
    send, via the communication interface, the identified modifications to a user computing device; and
    receive, via the communication interface, user feedback.

10. A method, comprising:
    at a computing platform comprising at least one processor, a communication interface, and memory:
        receiving, by the at least one processor, via the communication interface, a requirements document specifying high-level requirements for an application, wherein the requirements are provided in plain language sentences;
        extracting, by the at least one processor, context data from the requirements document, wherein extracting context data from the requirements document includes:
            identifying inferences from text of the requirements document, wherein identifying inferences from the text of the requirements document is performed using natural language processing;
            decomposing and parsing the requirements document into a set of linguistic distinctions; and
            employing part of speech tagging and relationship searching to identify sentence components and recognize and disambiguate entities in the text;

scanning, by the at least one processor, a repository of code to identify code to be modified based on the context data;

identifying, by the at least one processor, modifications to the code based on the context data;

generating, by the at least one processor, updated code based on the identified modifications;

deploying and testing, by the at least one processor, the updated code in a test environment;

determining, by the at least one processor, a variance between the updated code and the requirements document; and generating, by the at least one processor, a report to identify the variance.

11. The method of claim 10, further comprising:

comparing, by the at least one processor, the variance to a predetermined threshold; and accepting or redeploying, by the at least one processor, the updated code based on the comparison.

12. The method of claim 11, further comprising:

identifying, by the at least one processor, the variance being greater than a predetermined threshold; and responsive to identifying the variance being greater than the predetermined threshold, regenerating, by the at least one processor, one or more portions of the updated code.

13. The method of claim 11, wherein the predetermined threshold is set by a user of a computing device.

14. The method of claim 10, wherein receiving the requirements document comprises reading requirements from language independent documents.

15. The method of claim 10, wherein identifying modifications to code comprises detecting a type of programming language and syntax being used.

16. The method of claim 10, wherein generating the updated code based on the identified modifications comprises generating the updated code using a machine learning model.

17. The method of claim 10, further comprising:

sending, by the at least one processor, via the communication interface, the identified modifications to a user computing device; and receiving, by the at least one processor, via the communication interface, user feedback.

18. One or more non-transitory computer-readable media storing instructions that, when executed by a computing platform comprising at least one processor, a communication interface, and memory, cause the computing platform to:

receive, via the communication interface, a requirements document specifying high-level requirements for an application, wherein the requirements are provided in plain language sentences;

extract context data from the requirements document, wherein extracting context data from the requirements document includes:

identifying inferences from text of the requirements document, wherein identifying inferences from the text of the requirements document is performed using natural language processing;

decomposing and parsing the requirements document into a set of linguistic distinctions; and employing part of speech tagging and relationship searching to identify sentence components and recognize and disambiguate entities in the text;

scan a repository of code to identify code to be modified based on the context data;

identify modifications to the code based on the context data;

generate updated code based on the identified modifications;

deploy and test the updated code in a test environment;

determine a variance between the updated code and the requirements document; and generate a report to identify the variance.

* * * * *